No. 762,501. PATENTED JUNE 14, 1904.
G. STEINBERG.
PNEUMATIC TIRE.
APPLICATION FILED APR. 1, 1903.
NO MODEL.
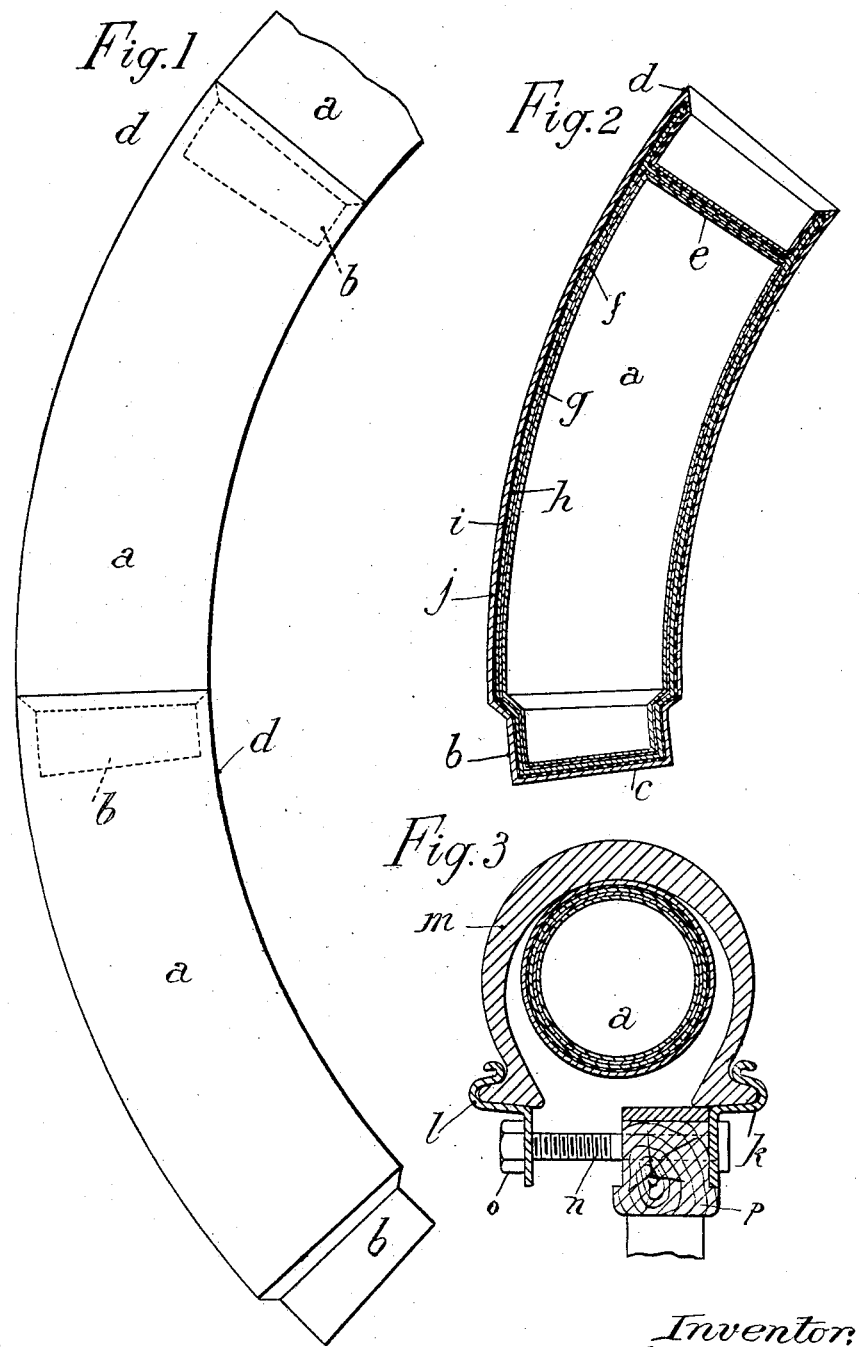

No. 762,501. Patented June 14, 1904.

UNITED STATES PATENT OFFICE.

GEORGES STEINBERG, OF PARIS, FRANCE.

PNEUMATIC TIRE.

SPECIFICATION forming part of Letters Patent No. 762,501, dated June 14, 1904.

Application filed April 1, 1903. Serial No. 150,528. (No model.)

*To all whom it may concern:*

Be it known that I, GEORGES STEINBERG, manufacturer, a citizen of the Republic of France, and a resident of No. 39 Rue Sainte Croix de la Bretonnerie, Paris, in the Republic of France, have invented new and useful Improvements in Pneumatic Tires, of which the following is a specification.

This invention relates to a method of manufacturing pneumatic cushions for forming an elastic tire for the wheels of cycles, motorcars, and other vehicles in which the air-cushions are automatically repaired in case of a puncture, owing to the walls thereof being constructed in a special manner. By means of this peculiar quality an air-cushion constructed according to this invention need not be provided with a pumping-valve, because it is possible to introduce a sharp-pointed tube proceeding from the pump or inflater into the wall of the air-cushion, which is withdrawn when the necessary pressure has been reached. In order to obviate the need for carrying about an entire air-cushion, which is cumbersome in the case of a carriage and practically impossible with a cycle, it is preferable to make the air-cushion in sections to fit round the wheel instead of making it in one piece. It is then only necessary to carry about with one a few sections, occupying very little room, to replace any which might be subjected to irreparable damage during a journey. By this means great economy is effected, inasmuch as one is not bound to replace the air-cushion in its entirety. Thus the invention comprises the means for permitting of dividing up the air-cushion, if desired, into sections of any suitable length constituting separate chambers or cushions and of which the ends, as well as the tubular part, are automatically repairable, the sections being suitably connected by a simple form of joint.

In order that the punctures may become sealed automatically, so as to keep the chambers air-tight, the latter or the sections thereof are, for example, according to this invention made of five superposed layers of different kinds arranged, respectively, in the following manner, starting from the inside: The first layer is composed of pure Pará rubber, a sticky substance which by heating or steaming becomes pasty, not being vulcanized. The second layer is made of pure Pará rubber, to which is added a small quantity of sulfur (or its equivalent) in order to only half vulcanize the india-rubber during the treating. The third layer is made of Pará rubber with enough sulfur to insure a complete vulcanization. The fourth layer suitably consists of very strong fabric, preferably cotton, coated with a sulfur solution of india-rubber which will become entirely vulcanized during the heating or steaming. Finally, the fifth layer, forming the outer covering, is made of Pará rubber mixed with sufficient sulfur to produce complete vulcanization.

Preferably the first layer (inside) is about a fifth of the total thickness of the wall of the chamber, as is also the third layer. The second layer is a little thinner. The outer covering or envelop, on the contrary, is slightly thicker, and the fourth layer is only the thickness of the solutioned fabric.

In order that this invention may be more easily understood, I will describe it with reference to the accompanying drawings, of which—

Figure 1 is an elevation of two sectional air-cushions and part of a third. Fig. 2 is a sectional elevation of one of the cushions, and Fig. 3 is a cross-section of a cushion with an outer cover and showing a convenient way of attaching the tire to the rim of a wheel.

As shown in Fig. 1, the air-cushions *a* are curved and are each provided with a spigot *b* at one end and a recess at the other end corresponding to the shape of the spigot, so that when a sufficient number of these cushions are fitted into each other they form a complete ring, forming the air-tube.

As shown in Fig. 2, the spigot part *b* of the joint and the ends *c* and *e* are formed of five layers in the same way as the cylindrical part *a*. The socket part *d* of the joint may be made merely of fabric and vulcanized india-rubber.

The layers *f*, *g*, *h*, *i*, and *j*, composed differently, as above set forth, are laid in the order before named either on a mandrel or in a mold, and at the same time the end covers and the male and female joint parts are formed if making a section, and then the article is put into the vulcanizing apparatus in a mold.

The layer $f$, which has become pasty and which is in direct contact with the compressed air inside when the chamber or section has been inflated, is that which contributes most to seal punctures after the removal of the foreign body which has produced them. The partly-vulcanized layer $g$, of rubber, serves to connect the layer $f$ and the completely-vulcanized layer of rubber $h$. The latter is somewhat stiff and strong and keeps its shape, as does also the outer layer $j$, which is also vulcanized and which is besides capable of resisting the weather, the shocks, and friction to which it is subjected, while finally the fabric $i$, interposed between the layers $h$ and $j$, fulfils its usual purpose of strengthening.

It will be understood that the relative thickness of the layers and their numbers may be varied to a certain degree provided that the inside of the chamber be made of unvulcanized india-rubber and its exterior of vulcanized india-rubber with an intermediate layer of partly-vulcanized india-rubber.

As aforesaid, the air-chambers or sectional pneumatic cushions made according to this invention need not be provided with a valve, and to inflate them it is sufficient to prick a hole in them with the delivery-nozzle of the pump, the end of which is cut obliquely for the purpose. When pumped up sufficiently, the nozzle is withdrawn and the puncture closes automatically. The inflation is effected in this manner whether it be before the sectional air-cushions are put on the wheel or whether it be desired to pump up again after a foreign body has allowed the air to escape while it was sticking into the wall of the air-chamber.

It is preferable to use removable rims or rim parts of any suitable construction in connection with pneumatic tires made according to this invention and as shown, for example, in Fig. 3. In this case the tire, whether made in one piece or in sections, may be inflated before being put into place. The tire is then put on the rim, of which one side part, $k$, (hook-shaped in section) is suitably a fixture, while the other side part, $l$, similarly formed, is adapted to be removable, being held in place by means of bolts $n$ and nuts $o$, the bolts passing through the wooden felly $p$ and the tire-sections being fitted one into the other in such manner as to form a complete ring of the desired diameter. In order to put the tire on, it is only necessary to open the rim to raise one of the edges of the outer cover $m$ and to insert the tire or sections thereof. The free edge of the outer cover is then pushed into place in the removable part $l$ of the rim, and the same is then closed and screwed up tight by the nuts $o$ aforesaid.

The invention may also be employed in connection with undetachable rims; but in that event the pneumatic air-cushion, whether it be made in one piece or in sections, is put on the rim or felly before being inflated. When the air-tube or the sections forming the same has or have been put on, the outer cover is closed and the tire is inflated by piercing the outer cover and the wall of the air-chamber by means of the pricking-nozzle of the inflater and by then pumping.

It is evident that the tire may be reinflated without removing the outer cover by sticking the aforesaid pricking-nozzle through the outer cover and the wall of the air chamber or chambers without removing the said outer cover irrespective of the type of rim or fastening for the cover employed.

I claim—

1. An air-cushioned tire for vehicle-wheels in which an intermediate covering of partly-vulcanized rubber is interposed between an inner lining of pure or unvulcanized rubber and an outer covering of wholly-vulcanized rubber.

2. An air-cushioned tire for vehicle-wheels, of which the wall is composed firstly of a layer of pure or unvulcanized india-rubber to form the inside, a second layer of partially-vulcanized india-rubber, a third layer of wholly-vulcanized india-rubber, a fourth layer consisting of a strengthening fabric coated with vulcanized india-rubber and finally of a fifth protecting layer of wholly-vulcanized india-rubber.

In testimony that I claim the foregoing as my invention I have signed my name, in presence of two witnesses, this 18th day of March, 1903.

GEORGES STEINBERG.

Witnesses:
AUGUSTUS E. INGRAM,
ALCIDE FABE.